United States Patent
Woo et al.

(10) Patent No.: US 9,125,431 B2
(45) Date of Patent: Sep. 8, 2015

(54) RESISTANT STARCH-HYDROCOLLOID BLENDS AND USES THEREOF

(75) Inventors: Kyungsoo Woo, Shawnee, KS (US); Sukh Bassi, Atchison, KS (US); Clodualdo C. Maningat, Platte City, MO (US); Lianfu Zhao, Gardner, KS (US); Ying Hong Zheng, Gardner, legal representative, KS (US); Li Nie, Parkville, MO (US); Michael Parker, Lawrence, KS (US); Shishir Ranjan, Meriden, KS (US); Jennifer Gaul, Atchison, KS (US); Christopher T. Dohl, Netawaka, KS (US); Gregory J. Stempien, Atchison, KS (US)

(73) Assignee: MGP Ingredients, Inc., Atchison, KS (US)

(*) Notice: Subject to any disclaimer, the term of this patent is extended or adjusted under 35 U.S.C. 154(b) by 37 days.

(21) Appl. No.: 12/580,755

(22) Filed: Oct. 16, 2009

(65) Prior Publication Data

US 2010/0034946 A1   Feb. 11, 2010

Related U.S. Application Data

(62) Division of application No. 11/689,620, filed on Mar. 22, 2007.

(51) Int. Cl.
| | | |
|---|---|---|
| A23L 1/0528 | (2006.01) | |
| A23L 1/29 | (2006.01) | |
| A21D 6/00 | (2006.01) | |
| A23L 1/308 | (2006.01) | |
| A23C 9/13 | (2006.01) | |
| A23C 9/137 | (2006.01) | |
| A23K 1/00 | (2006.01) | |
| A23K 1/16 | (2006.01) | |
| A23K 1/18 | (2006.01) | |
| A23L 1/0522 | (2006.01) | |
| A23L 1/24 | (2006.01) | |
| A23L 1/39 | (2006.01) | |

(52) U.S. Cl.
CPC . *A23L 1/308* (2013.01); *A23C 9/13* (2013.01); *A23C 9/137* (2013.01); *A23K 1/003* (2013.01); *A23K 1/1643* (2013.01); *A23K 1/1853* (2013.01); *A23L 1/05223* (2013.01); *A23L 1/246* (2013.01); *A23L 1/39* (2013.01); *A23V 2002/00* (2013.01)

(58) Field of Classification Search
CPC ............................. A23L 1/0522; C08B 30/12
USPC .......................................... 426/661, 659, 549
See application file for complete search history.

(56) References Cited

U.S. PATENT DOCUMENTS

| | | | | |
|---|---|---|---|---|
| 4,025,657 | A  * | 5/1977 | Cheng et al. ................... | 426/579 |
| 6,228,419 | B1 * | 5/2001 | Yuan et al. ...................... | 426/661 |
| 6,299,907 | B1 * | 10/2001 | Seib et al. ........................ | 424/499 |
| 6,391,352 | B1 * | 5/2002 | Hawkes et al. .................. | 426/96 |
| 2006/0008575 | A1 * | 1/2006 | Armbrecht et al. ............ | 426/659 |

OTHER PUBLICATIONS

NPL "Starch-Hydrocolloid" entitled "Starch-hydrocolloid composites prepared by steam jet cooking" by Fanta GF and Christianson DD in Food Hydrocolloids 10 (2): p. 173-178, 1996.*
NPL "Resistant Starch" entitled "Resistant Starch—A Review" by Sajilata MG et al. in Comprehensive Reviews in Food Science and Food Safety, 5: pp. 1-17, 2006.*

* cited by examiner

*Primary Examiner* — Michele L Jacobson
*Assistant Examiner* — Bhaskar Mukhopadhyay
(74) *Attorney, Agent, or Firm* — Hovey Williams LLP

(57) ABSTRACT

Interacted starch products made up of resistant starch and hydrocolloid are provided which exhibit at least about 20% resistance to α-amylase digestion. The products are prepared by mixing together quantities of resistant starch and hydrocolloid in water with mixing and optional heating, followed by drying. Foods containing the interacted starch products are also disclosed.

45 Claims, 14 Drawing Sheets

RESISTANT STARCH-HYDROCOLLOID BLENDS AND USES THEREOF

CROSS REFERENCE TO RELATED APPLICATION

This application is a division of identically titled application Ser. No. 11/689,620, filed Mar. 22, 2007, incorporated herein by reference.

BACKGROUND OF THE INVENTION

1. Field of the Invention

The present invention is broadly concerned with stable starch products including respective quantities of resistant starch and at least one hydrocolloid interacted with the starch. These products exhibit increased dietary fiber content, resistance to α-amylase digestion, and confer enhanced emulsion stabilities, and hot and cold water swelling capacities, in water-oil and other aqueous systems, and are particularly suited for use in food.

2. Description of the Prior Art

It is well known that certain types of starches are resistant to human pancreatic α-amylase digestion and provide the health benefits of dietary fiber upon ingestion. As a consequence, considerable research has been conducted to provide resistant starches of various types and modifications thereof.

In 1987 Englyst and Cummings at the MRC Dunn Clinical Nutrition Center in Cambridge, UK, proposed a classification of starch based on its likely digestive properties in vivo. They also devised in vitro assay methods to mimic the various digestive properties of starch. Three classes of dietary starch were proposed:

(1) Rapidly Digestible Starch (RDS). RDS is likely to be rapidly digested in the human small intestine; examples include freshly cooked rice and potato, and some instant breakfast cereals.

(2) Slowly Digestible Starch (SDS). SDS is likely to be slowly yet completely digested in the small intestine; examples include raw cereal starch and cooked pasta.

(3) Resistant Starch (RS). RS is likely to resist digestion in the small intestine. RS is thus defined as the sum of starch and starch degradation products not likely to be absorbed in the small intestine of healthy individuals. RS can be subdivided into four categories depending on the causes of resistance (Englyst et al 1992; Eerlingen et al 1993).

$RS_1$. Physically inaccessible starch due to entrapment of granules within a protein matrix or within a plant cell wall, such as in partially milled grain or legumes after cooling.

$RS_2$. Raw starch granules, such as those from potato or green banana, that resist digestion by α-amylase, possibly because those granules lack micropores through their surface.

$RS_3$. Retrograded amylose formed by heat/moisture treatment of starch or starch foods, such as occurs in cooked/cooled potato and corn flake.

$RS_4$. Chemically modified starches, such as acetylated, hydroxypropylated, or cross-linked starches that resist digestion by α-amylase. Those modified starches would be detected by the in vitro assay of RS. However, some $RS_4$ may not be fermented in the colon.

$RS_1$, $RS_2$, $RS_3$ are physically modified forms of starch and become accessible to α-amylase digestion upon solubilization in sodium hydroxide or dimethyl sulfoxide. $RS_4$ is chemically modified and remains resistant to α-amylase digestion even if dissolved.

Numerous methods have been disclosed for the production of various types of resistant starches. Raw granular starches with B-type crystallinity ($RS_2$) based upon high-amylose (more than 50%) corn starches are disclosed in U.S. Pat. Nos. 5,977,454, 6,451,367, 6,409,840, 6,303,174, and 5,977,454. U.S. Pat. Nos. 5,593,503 and 6,664,389 describe methods for producing resistant starches employing specific combinations of heat and moisture with high-amylase corn starches. Other references, including U.S. Pat. Nos. 5,281,276, 5,409, 542, 7,081,261, and 6,013,299 disclose methods for preparing non-granular, retrograded resistant starches, mainly based upon high-amylose starches, while U.S. Pat. Nos. 6,043,229 and 6,090,594 describe retrograded resistant starches made from tuber and non-high-amylose starches. Finally, U.S. Pat. Nos. 5,855,946 and 6,299,907, as well as U.S. published application 2006/0188631 disclose methods to produce resistant starches by appropriate cross-linking, using virtually any type starting starch material.

Interaction between starch and hydrocolloids have long been known and reported by many researchers. Fanta et al. prepared starch hydrocolloid composites by a jet cooking and drum drying process (*Food Hydrocolloids,* 1996 10 (2), 173-78), and showed that the products have physical properties different from those obtained by conventional cooking procedures, and suggested that the products be used in food systems as fat replacers, stabilizers, gelling agents, and thickeners. Shi et al. reported the effects of gum addition on pasting properties of starches and suggested that the interaction between leached amylose molecules and certain gums was responsible for viscosity increases before starch pasting (*Carbohydrates Polymer,* 2002 50; 7-18). Lim et al. (*Cereal Chemistry* 2002 79 (5), 601-06) found that dry heating of anionic gums with starch altered pasting properties depending upon the combination of starch and gum used.

However, the prior art does not address or suggest interaction products made from resistant starches and hydrocolloids, or any resulting nutritional or functional benefits.

SUMMARY OF THE INVENTION

The present invention overcomes the problems outlined above and provides new classes of resistant starch-based products having significantly enhanced functional properties making them highly suitable for use in food systems. Broadly speaking, the starch products of the invention comprise respective quantities of resistant starch and at least one hydrocolloid interacted with the starch such that the product has at least about 20% resistance to α-amylase digestion.

The resistant starch is generally selected from the group consisting of cereal, root, tuber, and legume starches and mixtures thereof. The hydrocolloids may be selected from the group consisting of pectins, carrageenans, alginates, gums, celluloses, and mixtures thereof.

The products of the invention are easily prepared by forming a dispersion or mixture of the resistant starch and hydrocolloid in the presence of water with appropriate mixing, followed by drying. Optionally, the mixture may be heated during mixing and/or drying to strengthen the interaction between the resistant starch and hydrocolloid. Depending upon the method and degree of heating, any crystalline fraction of the starting resistant starch can be maintained intact or may undergo partial to complete melting.

The final products exhibit a detectable morphology under SEM and CSLM analyses, and show enhanced nutritional values and dietary fiber contents. The products also have improved functionalities in aqueous systems such as hot or cold water swelling capacity and emulsion stability. The products may be used in a variety of human or animal food systems.

DETAILED DESCRIPTION OF THE PREFERRED EMBODIMENTS

Figure 1A:
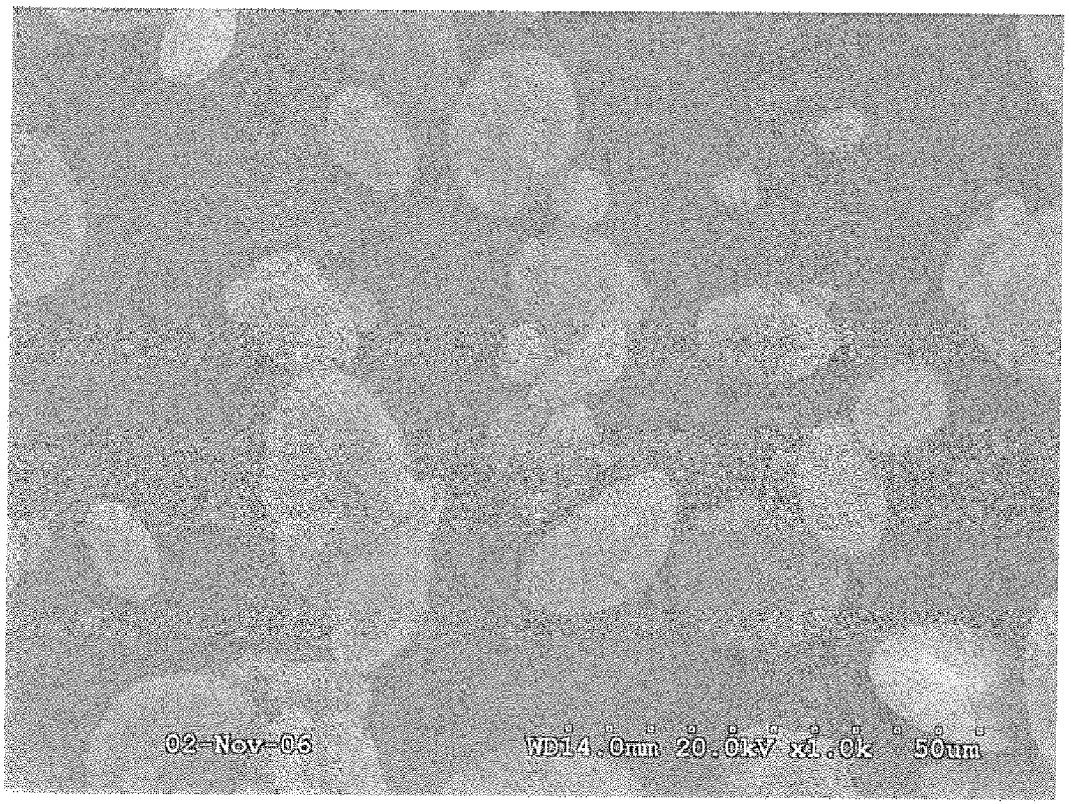
FIG. 1A is an SEM (1000×) image of native wheat starch.

The stable resistant starch/hydrocolloid interacted products of the invention broadly comprise respective quantities of resistant starch and at least one hydrocolloid, wherein the interacted product has at least about 20% resistance to α-amylase digestion. As used herein, "resistance to α-amylase digestion" refers to such resistance as measured by the Association of Official Analytical Chemists (AOAC) Method 991.43. More preferably, the products hereof should have a resistance to α-amylase digestion of at least about 30%, and still more preferably at least about 40%.

The resistant starches used in the invention are selected from the group consisting of cereal, root, tuber, and legume starches, and mixtures thereof. Most preferred starches are those selected from the group consisting of wheat, waxy wheat, corn, waxy corn, high amylose corn, oat, rice, tapioca, mung bean, sago, sweet potato, barley, triticale, sorghum, banana, arrowroot, and potato starches and mixtures thereof. "Waxy" starches typically include at least about 95% by weight amylopectin, whereas "high amylose" starches have at least about 40% by weight amylose. Although essentially all types of known resistant starches are useable in the invention, preferred starches of this character include RS2, raw granular starch with B-type crystallinity, RS3 retrograded, and RS4 chemically modified. Individual preparation conditions and parameters for various resistant starches are set forth in the aforementioned patents.

Chemically, physically, or genetically modified forms of starches can also be used in the invention, so long as such starches are sufficiently resistant to α-amylase digestion. Typical modification techniques include treatment with chemicals and/or enzymes according to 21CFR172.892; physical transformations such as by retrogradation (re-crystallization), heat treatment, partial gelatinazation, annealing, and roasting; genetic modifications such as gene or chromosome engineering including cross-breeding, translocation, inversion and transformation; and combinations of the above.

The single most preferred class of resistant starches for use in the invention are the chemically cross-linked starches. Although a variety of cross-linking agents may be used in this context, phosphate cross-linkers are particularly preferred owing to existing FDA regulations. Thus, phosphorous oxychloride (not exceeding 0.1% in the reaction mixture), sodium trimetaphosphate (STMP) (residual phosphate not exceeding 0.4% calculated as phosphorous), and mixtures of STMP and sodium tripolyphosphate (STPP) (residual phosphate not exceeding 0.4% calculated as phosphorous) are especially suitable cross-linking agents. On the other hand, where regulatory conditions warrant, cross-linking agents such as adipic acid and epichlorohydrin may be used.

Generally, where STMP/STPP mixtures are used as the cross-linking agent, the mixture should include from about 1-20% by weight STMP (more preferably about 5-12%) and from about 0.1-0.2% by weight STPP (more preferably about 0.05-0.12%). The overall STMP/STPP mixture is generally used at levels of from about 1-20% by weight, more preferably about 5-12% by weight. When STMP is used alone, it is advantageously employed at a level from about 1-20% by weight more preferably about 5-12% by weight. The foregoing percentages are based upon the weight of the starting unmodified starch taken as 100% by weight.

Using the preferred phosphorylating agents for cross-linking purposes creates distarch phosphate diesters containing from about 0.1-0.4% by weight phosphorous, and more preferably about 0.2% by weight thereof. The cross-linking reactions using such agents are carried out at about 25-70° C. (more preferably about 30-50° C.) over a period of about 10 minutes-24 hours (more preferably about 1-12 hours), and at a basic pH of from about 10-13, more preferably about 11-12. Such reaction conditions improve the yield of distarch phosphate as the predominate form of modified starch. Alternately, it is possible to perform the cross-linking reactions above normal gelatinization temperatures using a combination of salt addition and a controlled rate of temperature increase. For example, where STMP or an STMP/STPP mixture is used as the cross-linking agent, salt is added to the starch dispersion in an amount from about 0.1-20% by weight, based upon the weight of the starting starch taken as 100% by weight, in the form of sodium sulfate or sodium chloride. Added salt retards gel formation during the cross-linking reaction and increases alkali (base) absorption into the starch granules. Increased alkali inside the granules makes starch more reactive to chemical reagents such as STMP and STPP, and provides more favorable reaction conditions for distarch phosphate formation. Upon completion of the cross-linking reaction, the dispersion is neutralized with hydrochloric acid solution and the starch is washed with water to remove unreacted salt.

The hydrocolloid fraction of the products of the invention are typically water-soluble species having molecular weights of from about 200,000-2,000,000. Such hydrocolloids are high molecular weight polymers and generally exhibit random coil configurations. In dilute solutions, hydrocolloid polymers are free to move without overlapping, and interaction with other polymers are limited. In concentrated solutions, hydrocolloids more easily interpenetrate with each to form entangled polymer networks. The hydrocolloids useful in the invention are broadly selected from the group consisting of pectins, carrageenans, alginates, celluloses, and mixtures thereof, with more preferred hydrocolloids selected from the group consisting of xanthan, locust bean gum, guar gum, modified celluloses (e.g., microfibrillated cellulose, methylcellulose (MC), hydroxypropylmethylcellulose (HPMC), and carboxymethylcellulose (CMC)), sodium alginate, gum arabic, pectin, tara, agar, konjac, gellan, curdlan, carrageenans, and mixtures thereof.

In order to form the resistant starch products of the invention, respective quantities of selected resistant starch and hydrocolloid are mixed together in water in order to assure a substantially uniform dispersion, whereupon the mixture is dried to recover dried starch product. Generally, the starting reaction mixture includes at least about 15% by weight, more preferably about 30% by weight, of the resistant starch, and from about 0.1-20%, more preferably from about 1-5% of hydrocolloid. The mixing time generally ranges from about 5 minutes-2 hours, more preferably from about 20 minutes-1 hour.

The reaction mixture may also contain a variety of salts which have been found to assist in the formation of the desired final products. Such salts may be selected from the group consisting of alkali metal salts, alkaline earth metal salts, and salts of ammonium, chromium, zinc, silver, iron, and aluminum. These salts should be present at a level of from about 0.01-50% by weight (more preferably about 1-10% by weight).

In further preferred processing steps, the pH of the resistant starch/hydrocolloid aqueous mixture is adjusted to have a pH of from about 2-10, more preferably from about 4-8, and the reaction mixture is heated to a temperature from about 50-100° C. during at least a part of the mixing step. Furthermore, the desired interaction between the resistant starch and hydrocolloid can be augmented by a subsequent, more intensive heat treatment, e.g., 110-150° C. for 1-5 hours, more preferably about 120-140° C. for 3 hours.

Depending upon the processing conditions employed, the resistant starch fraction of the reaction mixture may partially or completely lose any crystalline phase therein, owing to partial or complete melting of the starch. For complete loss of crystallinity in the case of non-high amylose starches, heating at or above 80° C. for a period of about 30 minutes is normally required; where high-amylose starches are used, a temperature of above 110° C. is typical. In other cases less than complete loss of crystallinity occurs, i.e., the starch product retains at least about 10% (or up to about 30%) native starch crystallinity. The extent of disappearance of the crystalline phase in the starch fraction is most easily measured by differential scanning calorimetry (DSC), which measures heat flow as a function of temperature.

The drying step may be carried out by a variety of means such as by oven, freeze, spray, drum, flash, fluidized bed, vacuum, or thermal reactor drying. Such drying may further contribute to the loss of crystallinity in the starch fraction, again depending upon time-temperature conditions during drying. Generally, the drying is carried out so that the products are dried to below about 20% by weight, more preferably below about 15% by weight.

Figure 1B:
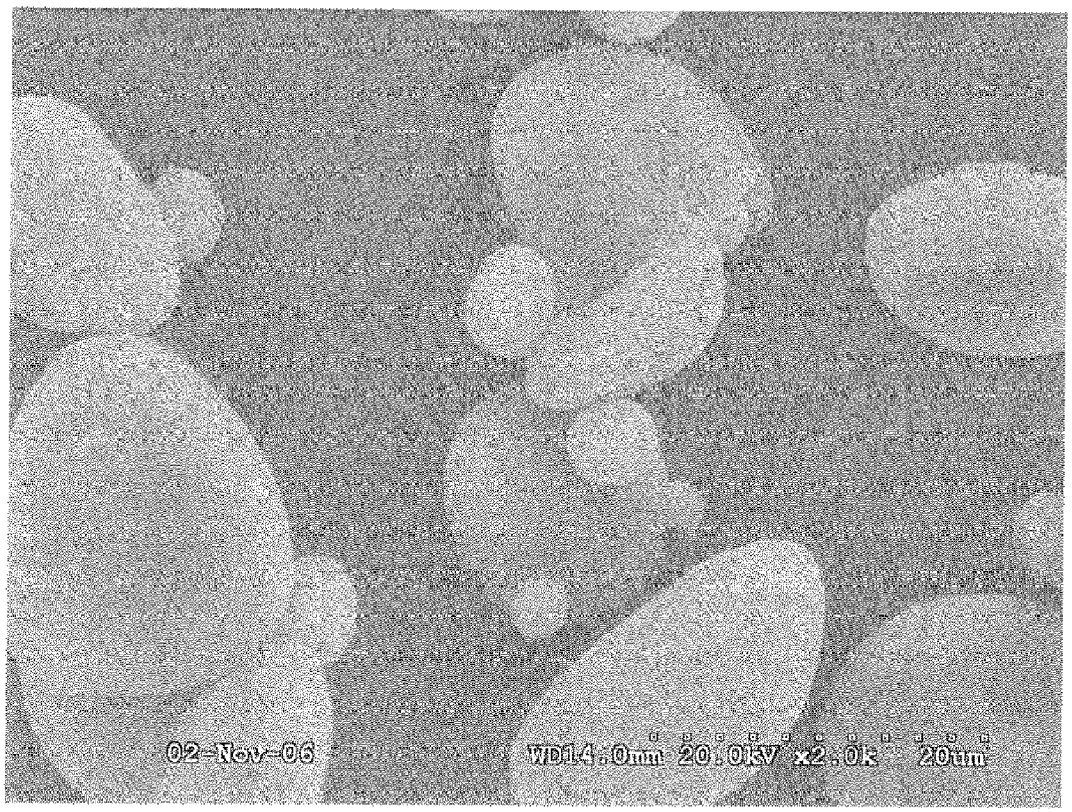
FIG. 1B is an SEM (2000×) image of native wheat starch.
Figure 2A:
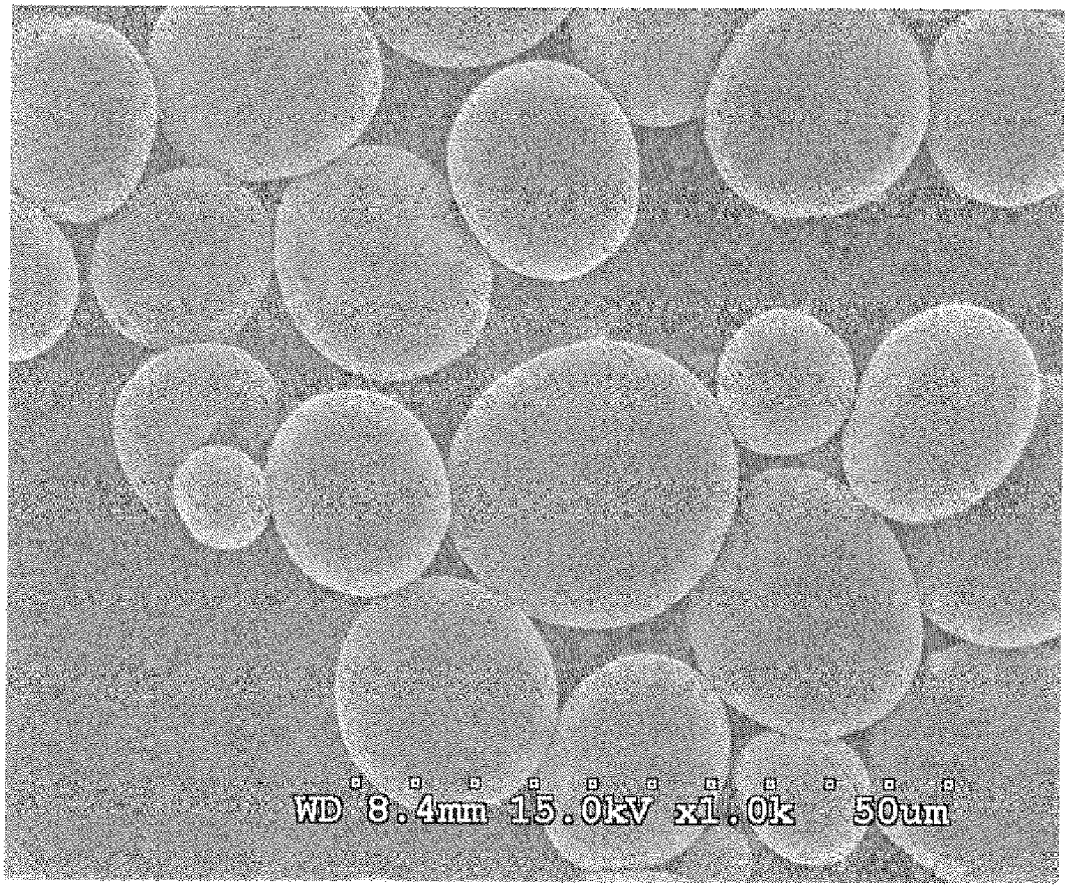
FIG. 2A is an SEM (1000×) image of cross-linked resistant wheat starch of the type as described in U.S. Pat. No. 5,855, 946.
Figure 2B:
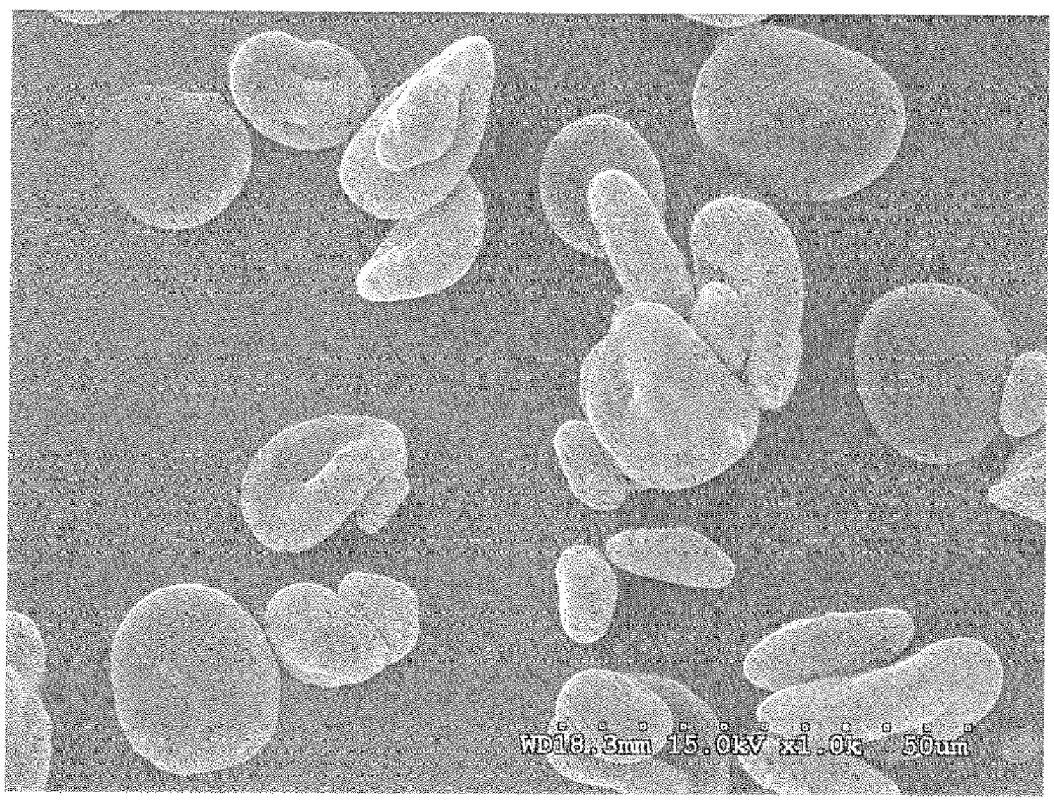
FIG. 2B is an SEM (1000×) image of non-crystalline cross-linked resistant wheat starch.
Figure 3:
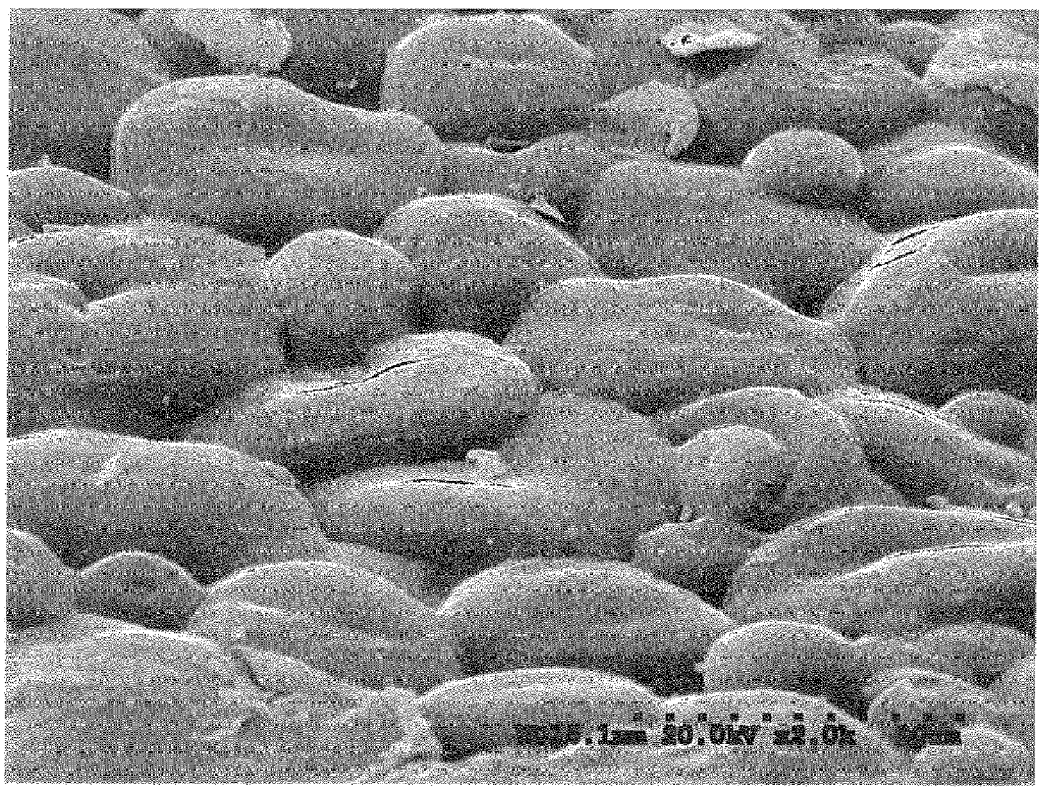
FIG. 3 is an SEM (2000×) image of cross-linked resistant wheat starch interacted with sodium alginate (5% w/w, starch basis)
Figure 4A:
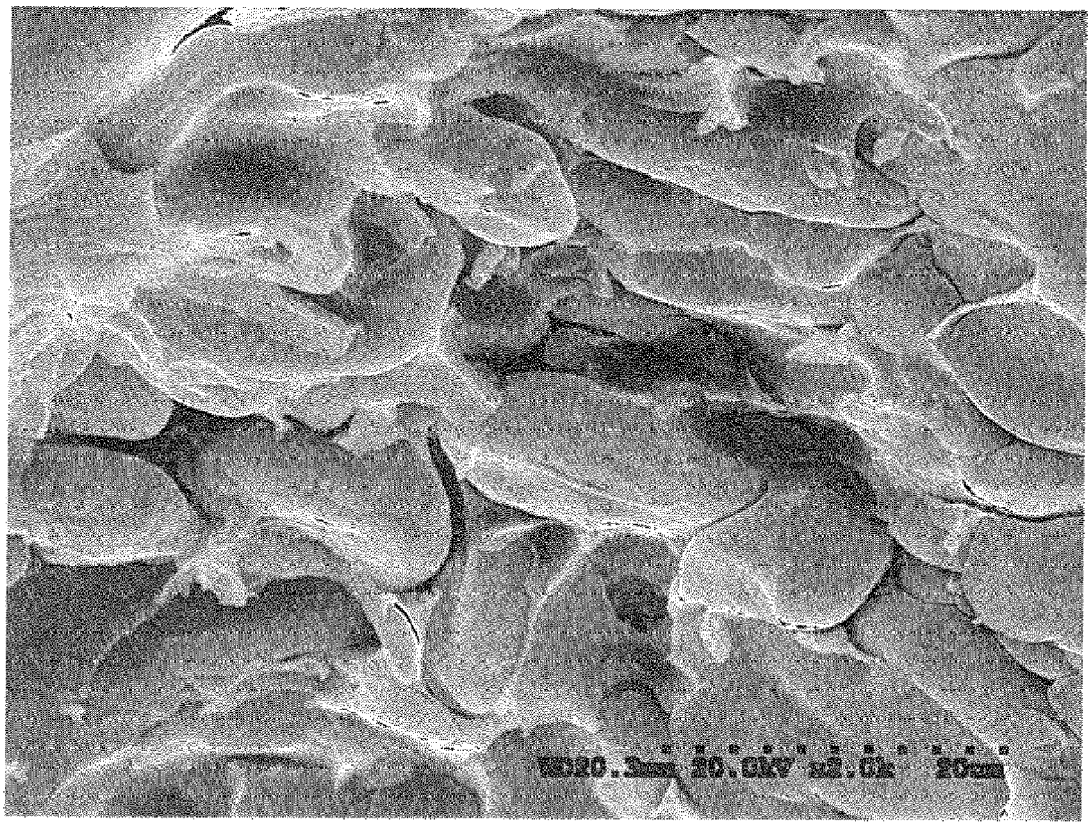
FIG. 4A is an SEM (2000×) image of cross-linked resistant wheat starch interacted with hydroxypropyl methyl cellulose (5% w/w, starch basis)
Figure 4B:
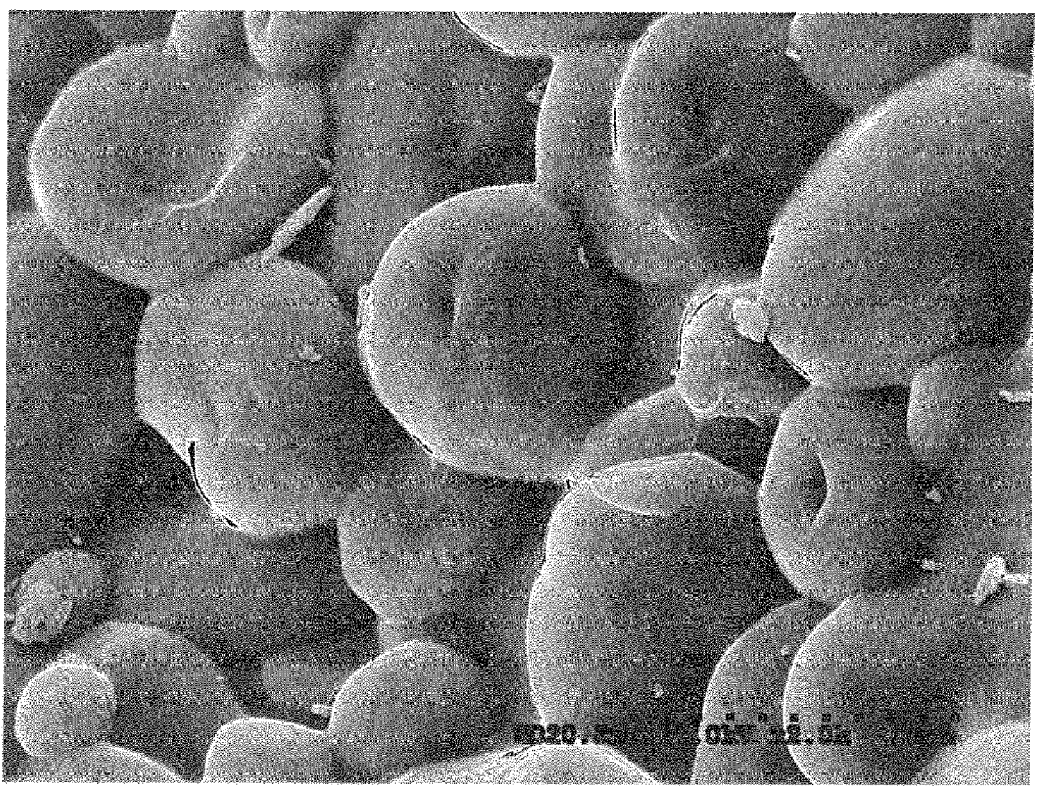
FIG. 4B is an SEM (2000×) image of cross-linked resistant wheat starch interacted with carboxymethyl cellulose (5% w/w, starch basis)
Figure 5A:
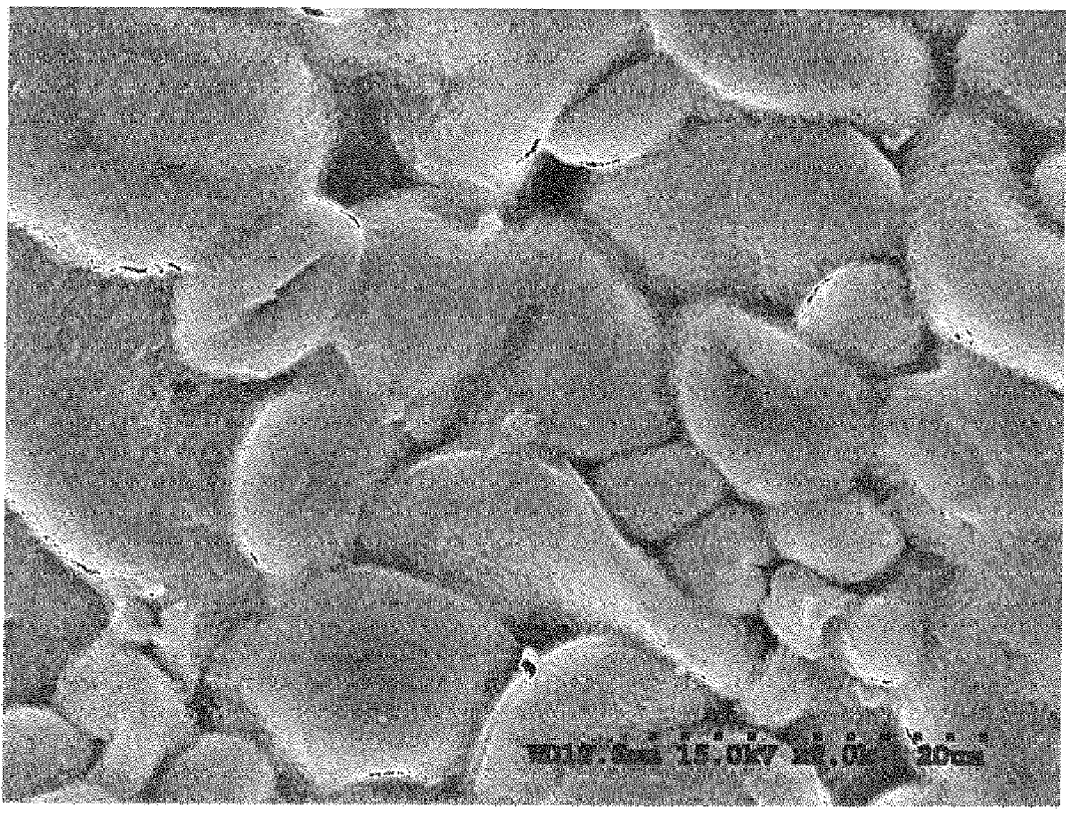
FIG. 5A is an SEM (2000×) image of cross-linked resistant wheat starch interacted with κ-Carrageenan.
Figure 5B:
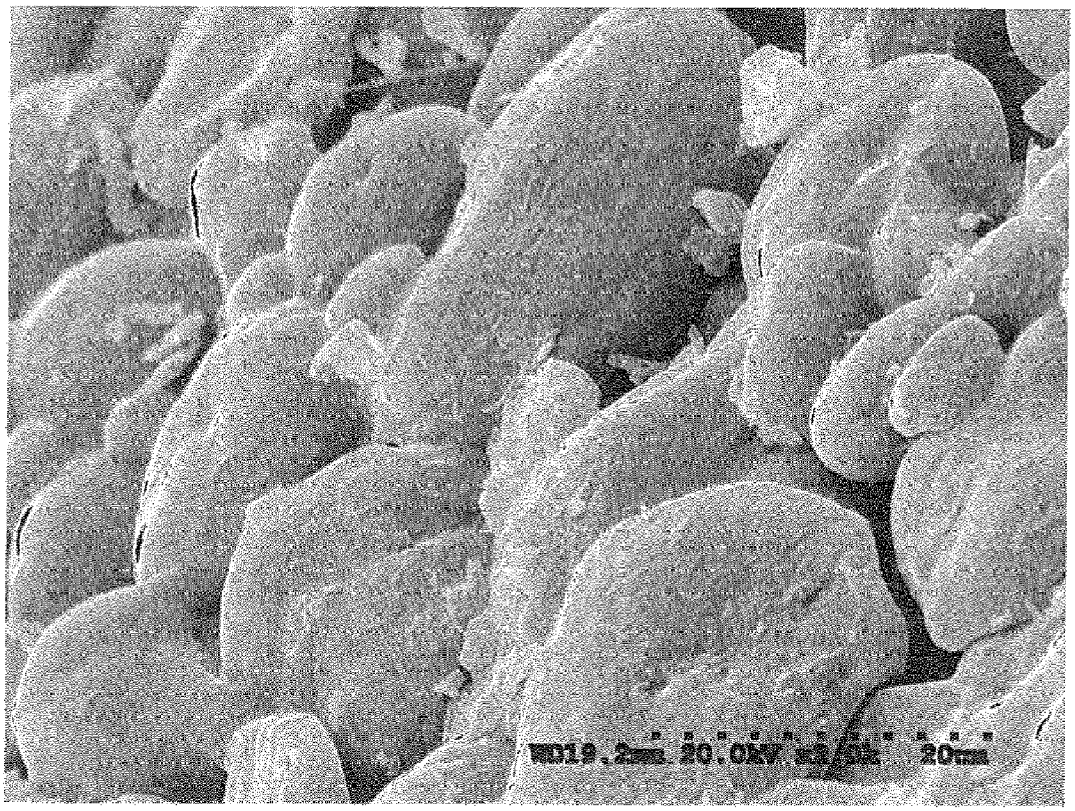
FIG. 5B is an SEM (2000×) image of cross-linked resistant wheat starch interacted with 1-Carrageenan.
Figure 6A:
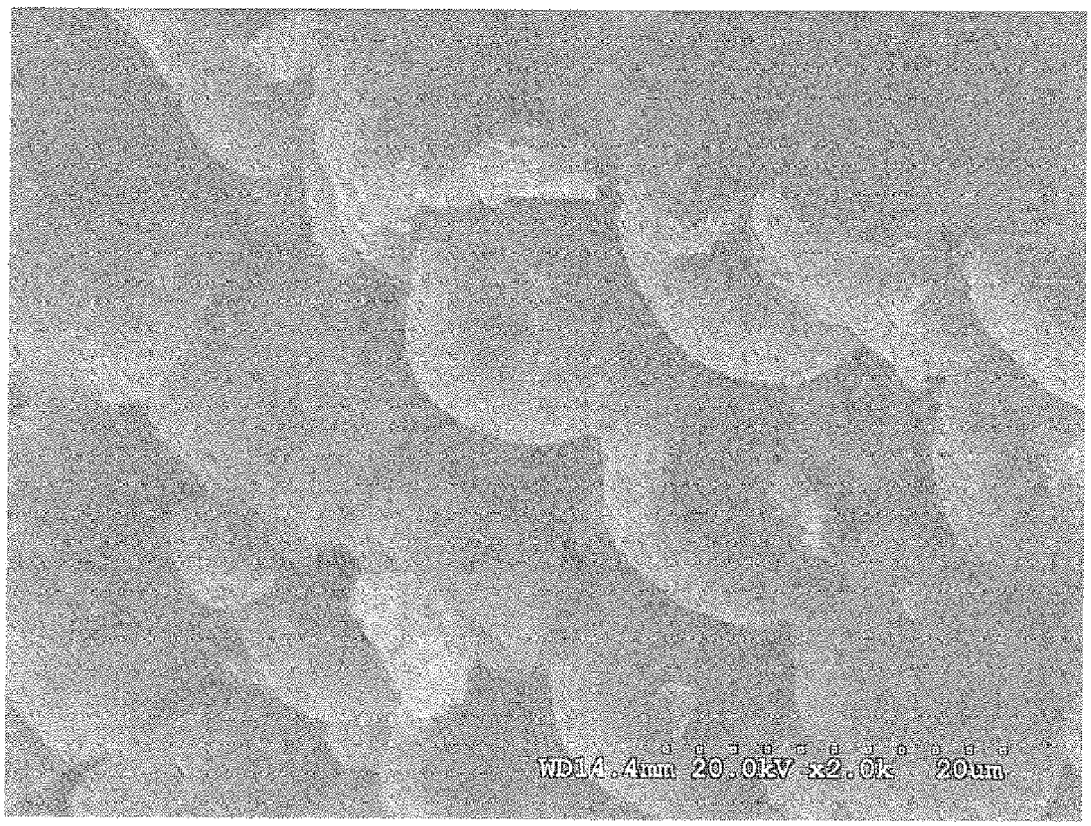
FIG. 6A is an SEM (2000×) image of cross-linked resistant wheat starch interacted with a 1:1 mixture of κ-Carrageenan and locust bean gum (5% w/w, starch basis)
Figure 6B:
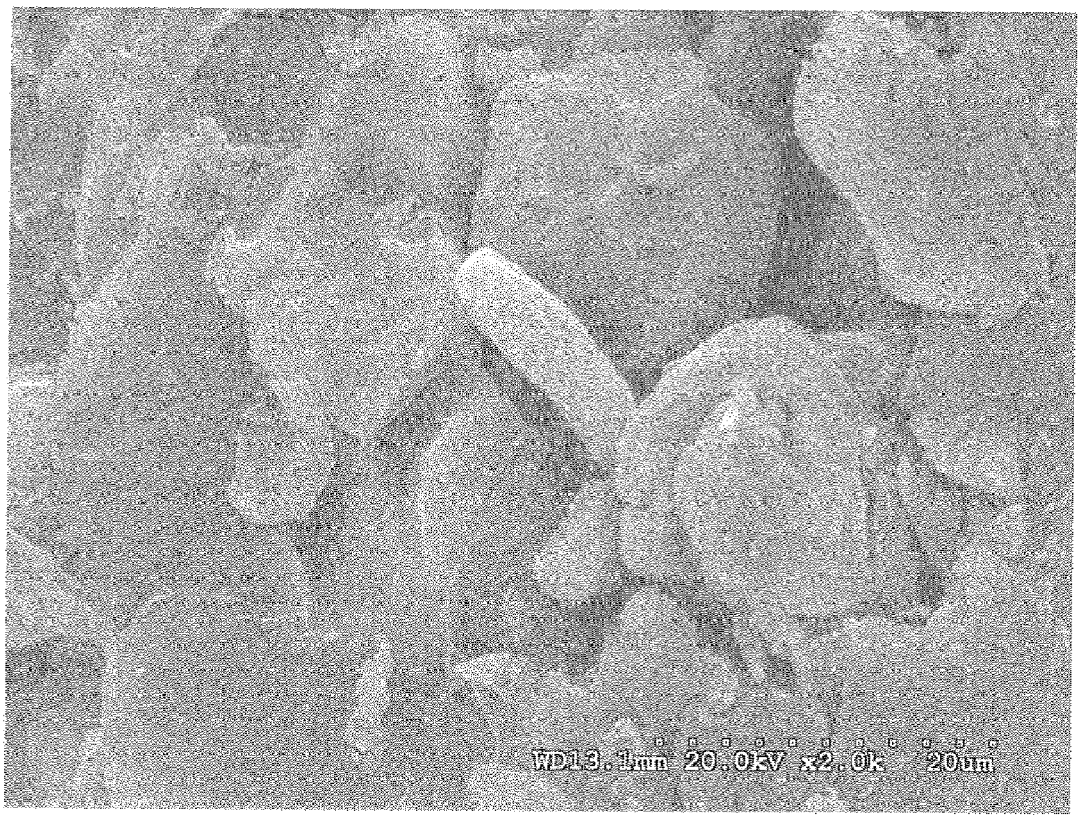
FIG. 6B is an SEM (2000×) image of cross-linked resistant wheat starch interacted with a 1:1 mixture of κ-Carrageenan and potassium hydroxide (2% w/w, starch basis)
Figure 7A:
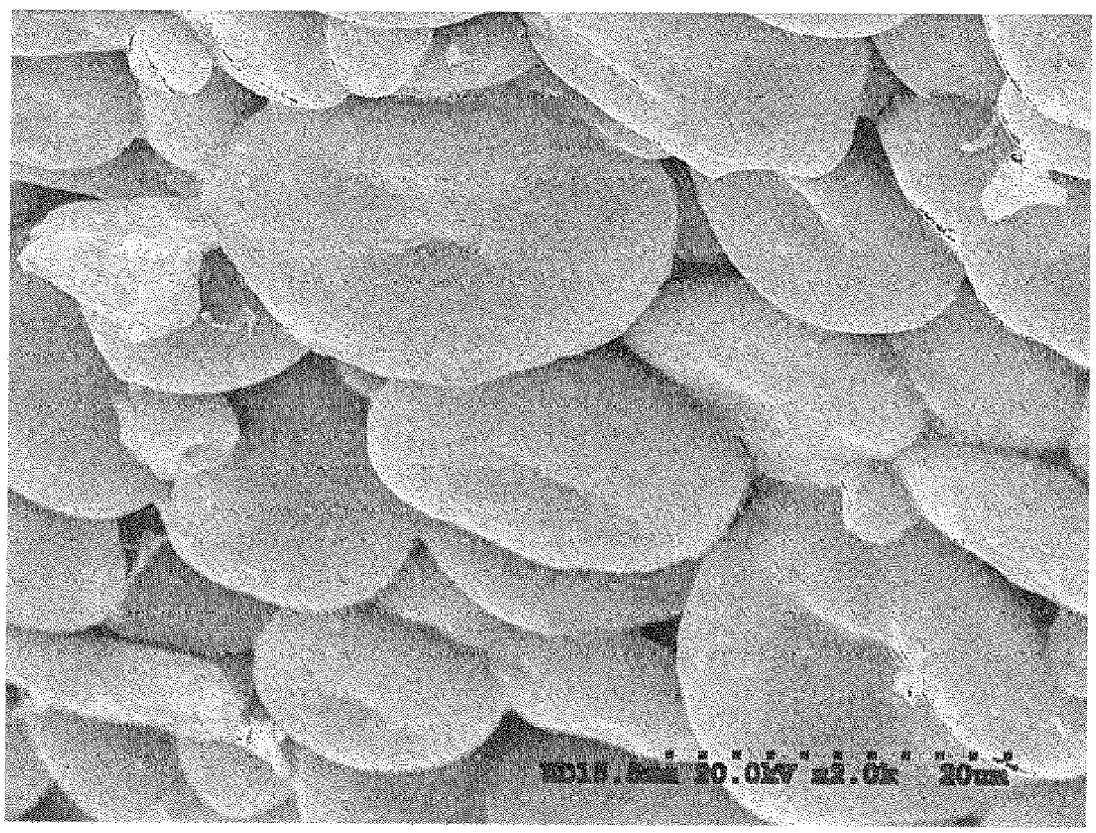
FIG. 7A is an SEM (2000×) image of cross-linked resistant wheat starch interacted with xanthan (2% w/w, starch basis)
Figure 7B:
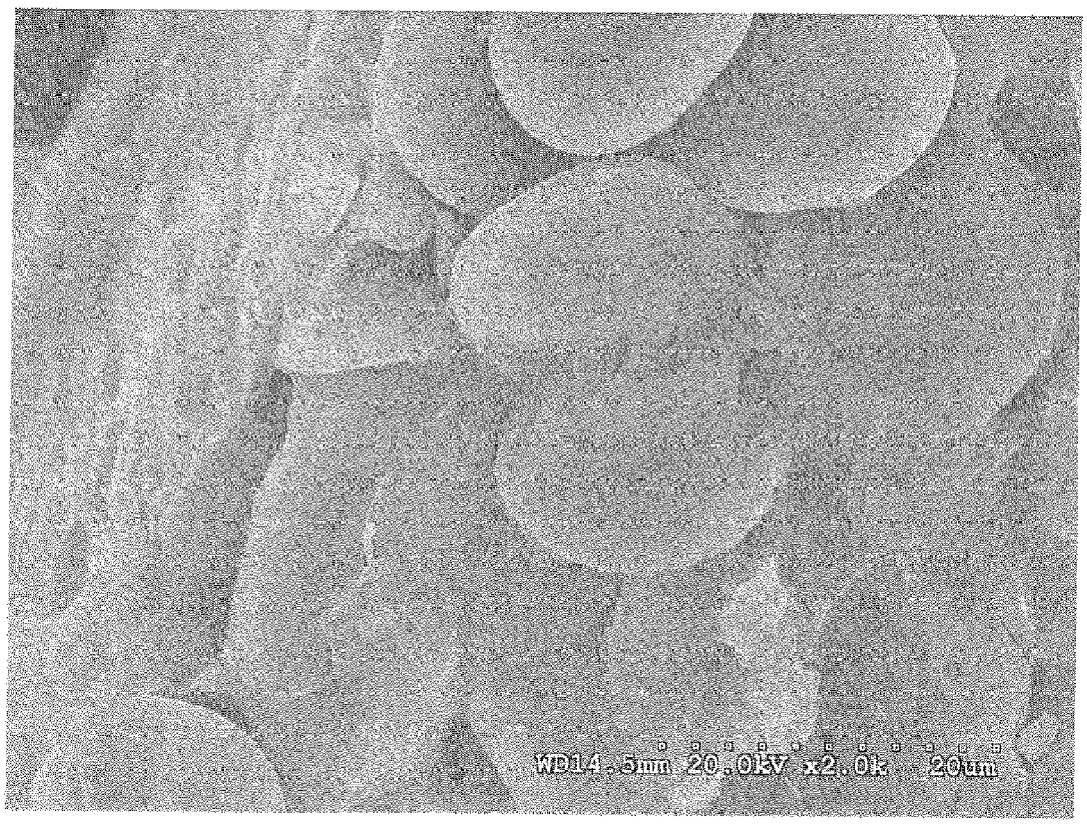
FIG. 7B is an SEM (2000×) image of cross-linked resistant wheat starch interacted with a 1:1 mixture of locust bean gum and xanthan (5% w/w, starch basis)
Figure 8:
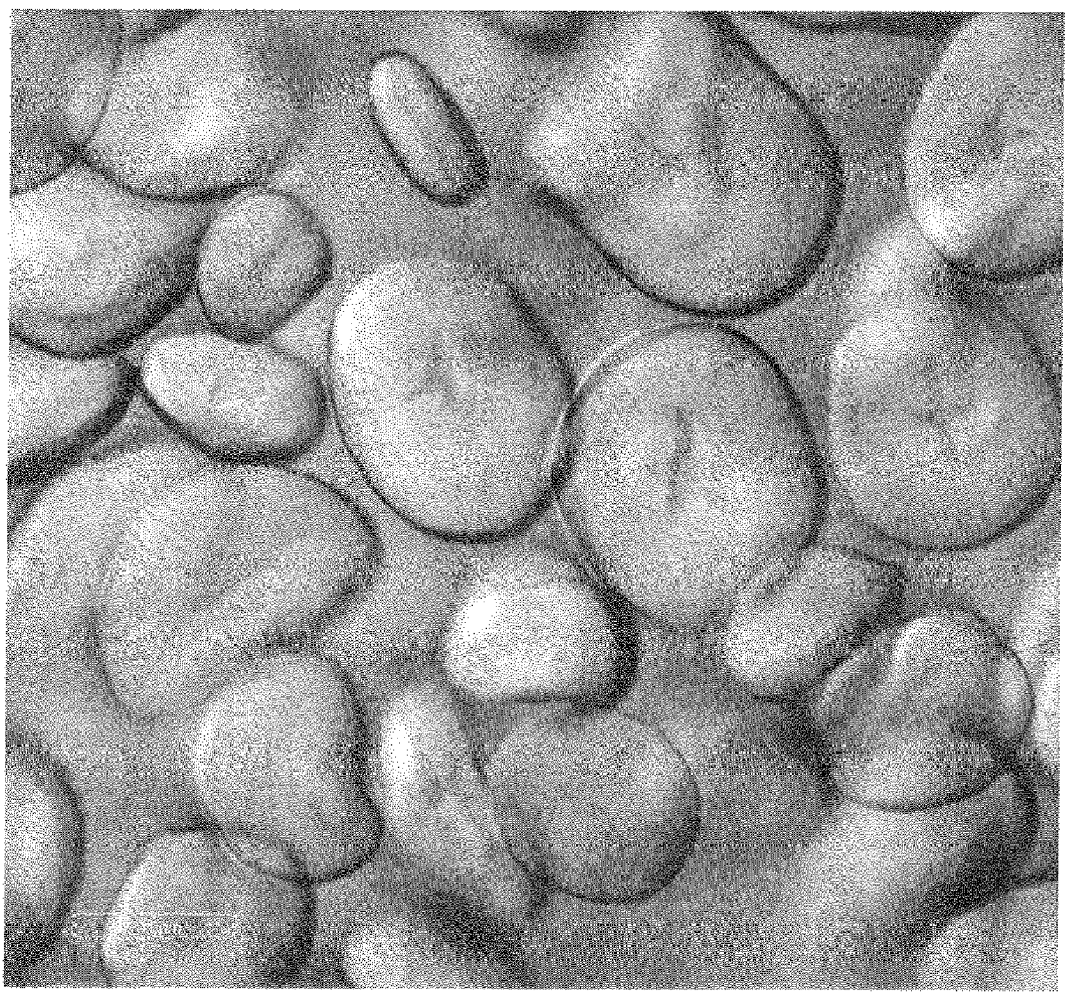
FIG. 8 is a confocal microscopic image (2000×) of pregelatinized, cross-linked resistant wheat starch interacted with sodium alginate (2% w/w, starch basis), prepared by heating and spray drying.

The finished, dried resistant starch/hydrocolloid interacted product of the invention generally contains from about 80-99.9% by weight resistant starch, and more preferably from about 90-99% by weight. Also, such products have from about 0.1-20% by weight hydrocolloid, more preferably about 1-10% by weight hydrocolloid, and most preferably from about 1-5% by weight. As shown in the Figures, and particularly by a comparison of FIGS. 1A and 1B (native starch) versus the remainder of the images illustrating various interacted wheat starch-based/hydrocolloid products of the invention, the hydrocolloid tends to form a partial or complete coating on the surface of the resistant starch granules, which is understood to be largely responsible for the novel properties of the products of the invention. It is believed that the hydrocolloid forms a protective layer on the resistant starch surface which limits enzyme accessibility to the protected starch, leading to the improved enzyme resistance.

In preferred aspects of the invention, and using the preferred reaction conditions, the hydrocolloids appear to interact with resistant starch granules during heating and dehydration which provides highly concentrated conditions. SEM images of these interactions confirm the significance of these interactions, and that the hydrocolloid protective coatings act as good barriers against α-amylase digestion, thereby increasing dietary fiber levels and enhancing functional properties such as water holding capacity, water dispersibility, and emulsification stabilization. (See Examples 3A, 3B, 3E, and 3F). As indicated previously, the extent of interaction between the resistant starch granules and hydrocolloid can be controlled by appropriate selection of the type and level of hydrocolloid(s) used, the presence of salt(s), moisture content, and the extent of reaction time and heating.

In more detail, it has been found that the products of the invention have a greater percent of dietary fiber content, as compared with the starting resistant fraction thereof, i.e., at least about 1% increased dietary fiber, more preferably at least 3%, still more preferably at least 5%, and most preferably at least 10% increased dietary fiber. Furthermore, the interacted products of the invention confer an emulsion stability in water-oil systems, as measured by the test described herein, which is at least 5% greater than the conferred emulsion stability of the resistant starch fraction alone. Such increased emulsion stability is more preferably at least about 10%, still more preferably at least 20%, and most preferably at least about 40% greater than the resistant starch fraction alone. Additionally, the interacted products in aqueous systems_confer cold and/or hot water swelling properties, measured as described herein, which is/are at least about 5% greater than the corresponding cold or hot water swelling of the resistant starch fraction alone; this level of increase is preferably at least about 10%, more preferably at least about 20%, and most preferably at least about 40% greater than that of the resistant starch fraction itself.

The products of the invention are particularly suited for use in food systems and provide increased quantities of dietary fiber while also enhancing organoleptic properties of the foods. Broadly, the foods may be either human foods or animal feeds, and the products hereof would usually be present therein at a level of from about 1-40% by weight. In the case of human foods, the products find particular utility in cereal grain-containing foods (e.g., baked or fried wheat-based products) and refrigerated or frozen foods such as puddings and ice creams. In the context of animal feeds, the resistant starch/hydrocolloid interacted products may be used in daily ration feeds or in chewable dog treat products. In the later instance, typical dog treats would contain 10-50% of the product, and would also normally have respective fractions of pre-gelatinized starch and gluten therein. Such dog treats may be manufactured by conventional extrusion or injection molding techniques.

The following examples set forth presently preferred methods of producing the resistant starch/hydrocolloid interaction products of the invention. It is to be understood, however, that these examples are provided by way of illustration and nothing therein should be taken as a limitation upon the overall scope of the invention.

Example 1

Production of Cross-Linked Resistant Starch

Cross-linked resistant wheat starch was prepared according to the methods described in U.S. Pat. No. 5,855,946. Resistant potato starch and resistant tapioca starches were also prepared as described in the '946 patent by substitution of potato starch or tapioca starch for wheat starch. These products are available under the commercial names of Fibersym 70 and Fibersym 80-ST from MGP ingredients Inc and Actistar RT form Cargill Inc.

In more detail, wheat starch (50 g, dry basis), water (70 ml), sodium trimetaphosphate (5.94 g, 11.88%, based on starch ["bos"]), with STPP (0.06 g, 0.12%, bos) and sodium sulfate (5 g, 10%, bos) were placed in a round bottom flask, and the mixture was adjusted to pH 11.5 by adding 1.0M sodium hydroxide (.about.25 ml). The slurry was stirred continuously, warmed to 45° C., and held at 45° C. for 3 h. After that time, the pH of the slurry was found to decline by .about.0.2-0.3 pH units. The slurry was adjusted to pH 6.5 by adding 1.0M hydrochloric acid, usually less than .about.20 ml, and the starch was collected by centrifugation and washed with water (4.times.100 ml) and dried at 40° C.

Example 2

Production of Cross-Linked Resistant Starch and Non-Cross-Linked Resistant Starch/Hydrocolloid Interacted Products Cross-linked resistant starches as described in Example 1 were interacted with hydrocolloids as follows. Food grade hydrocolloid (10.0 g) was slowly added to a 1 L beaker with 600 ml of water and mixed for 30 min. Cross-linked resistant starch (200 g) was next added to the beaker and mixed for an additional 30 min. The product is then dried in a conventional forced air oven at 45° C. to a moisture content of about 10%.

Comparative non-cross-linked resistant starches were used in lieu of the cross-linked resistant starches to prepare comparable interacted products. However, with these non-cross-linked starches (for example retrograded RS3 starch), greater water absorption was observed and an additional 200-400 ml of water was added to the reaction mixture to facilitate mixing.

Alternately, appropriate interaction of resistant starches and hydrocolloid can also be achieved by uniform mixing of dry powders of resistant starch and hydrocolloid before mixing with water. This mixture was heated at 80° C. for 30 min with continued mixing. After heating the mixture was cooled to room temperature and dried in conventional forced air oven at 45° C. to a moisture content about 10%.

Example 3

Production and Evaluation of Resistant Starch/Hydrocolloid Interaction Products General Methods Total Dietary Fiber (TDF) Measurement All analyses were done in triplicate. Total dietary fiber in pregelatinized forms of cross-linked resistant starch was determined using the Sigma TDF-100A kit for AOAC Official Method 991.43 (1995). Starch (1.00 g, dry basis) was dispersed in 0.05M MES-TRIS buffer solution (40 ml, pH 8.2) in a 400 ml tall-form beaker and a heat-stable α-amylase solution (50 μL) was added. The mixture was incubated in a shaking waterbath (Precision, model 25, Winchester, Va.) at 95° C. for 35 minutes. After cooling to 60° C., the mixture was mixed with protease (100 μL) and incubated for 30 minutes. The digest was adjusted to pH 4.5 with 0.561 N hydrochloric acid. Glucoamylase (100 μL) was added and the mixture was incubated for 30 minutes at 60° C. An insoluble residue was precipitated by adding 4 volumes of 95% ethanol. The residue was collected on a diatomaceous earth packed filter, dried overnight at 105° C., weighed and calculated as total dietary fiber.

Emulsion Stability Test

In the emulsion stability test, 5 g of starch/hydrocolloid interaction product was dispersed in 50 ml of water and 50 ml of oil, and the mixture was heated at 95° C. for 30 min with continuous stirring (SV95-W/O). In other cases, emulsion stabilities were also determined at room temperature (25° C.) with stirring for 30 min. Thereafter the mixture was transferred to graduated cylinder for measurement after 24 h. The volume of precipitated starch in water, and the starch dispersed in oil layers in the graduated cylinder were divided by the dry weight of starch. The emulsion stability was determined by the volume of oil layer stabilized by starch Cold and Hot Water Swelling Test The resistant starch/hydrocolloid products were tested by cold water and hot water swelling tests. For the cold water swelling test, 5 g of the product was dispersed in 100 ml of cold water and the mixture was transferred to a graduated cylinder for measurement after 24 h setting time. A swollen volume (SV 25) was determined by measuring the swollen volume of the starch/hydrocolloid interaction product in the graduated cylinder, divided by the dry weight of the product. In the hot water swelling test, 5 g starch/hydrocolloid interaction products was dispersed in 100 ml of cold water, and the mixture was heated to 95° C. with continuous stirring. Thereafter, the mixture was transferred to a graduated cylinder for measurement after 24 h setting time. As in the cold water swelling test, swollen volume (SV 95) was determined by measuring the swollen volume of the product in the graduated cylinder, divided by the dry weight of starch.

Differential Scanning Calorimetry (DSC)

Starch thermal properties were determined by differential scanning calorimetry using a Perkin-Elmer Pyres 6, which had been calibrated for temperature and enthalpy measurements using indium and zinc standards. The resistant starch/hydrocolloid interaction products were mixed with water in about a 1:3 ratio (15 mg:45 μL) and sealed in a stainless steel pan. Scanning was performed between 5 and 180° C. at a rate of 10° C./min, and cooling was observed between 180 and 5° C. at a rate of 25° C./min.

Scanning Electron Microscopy (SEM)

SEMs were taken with an Etec-Auto scanning Electron Microscope (Hitachi S-3000N Variable Pressure SEM, Pleasanton, Calif.) at an accelerating potential of 20 kv. The product samples were sprinkled onto double-sided adhesive tape on top of specimen stubs, and then coated with gold.

Confocal Laser Scanning Microscopy (CLSM)

Product samples were mixed with water (~10%; w/v) and rocked for ~1 h. A drop of each sample was placed on a glass cover slip and examined with 100× lens on an inverted microscope. The transmission DIC images were collected at high resolution (2048×2048 frame size) using an Olympus FV500 confocal laser scanning system.

Example 3A

Production of Resistant Starch/Hydrocolloid Interaction Products Using Oven Drying One hundred parts of commercially available cross-linked resistant wheat starch (Fibersym 70, MGP Ingredients, Inc, Atchison, Kans.), 5 parts of hydrocolloid, and 250 parts of water were mixed for 30 min and heated for 30 min at 85° C. under continued mixing. The resultant products were oven dried as previously described, and were evaluated as follows, together with cross-linked resistant starch alone as a control.

TABLE 1

| Hydrocolloid | TDF by AOAC- 991.43 | SV95 | SV95-W/O ppt | Water | Starch/oil |
|---|---|---|---|---|---|
| Cross-linked RS (control) | 68.1% | 2.8 | 3.0 | 6.4 | 10.6 |
| K-Carrageenan | 75.8% | 2.8 | 3.0 | 6.8 | 11.0 |
| K-Carrageenan/LBG (1:1) | 72.7% | 3.4 | 2.6 | 4.0 | 13.4 |
| Xanthan/LBG (1:1) | 58.1% | 20.0 | 4.0 | 0 | 16.0 |
| High methoxyl pectin | 70.9% | 3.0 | 3.2 | 6.4 | 10.4 |
| Low methoxyl pectin | 71.3% | 3.4 | 3.4 | 6.2 | 10.4 |
| Carboxymethyl cellulose | 88.6% | 6.6 | 5.2 | 4.8 | 10.0 |
| Sodium alginate | 87.5% | 3.0 | 4.4 | 4.8 | 10.8 |
| l-carrageenan | 79.3% | 3.0 | 3.0 | 6.8 | 10.2 |
| Tara gum | 72.1% | 4.4 | 5.0 | 3.2 | 12.0 |
| HPMC | 69.6% | 3.4 | 3.0 | 4.4 | 12.6 |

LBG = Locust bean gum,
HPMC = hydroxyproplymethly cellulose
ppt = Precipitate formed in the bottom of graduated cylinder

Example 3B

Production of Resistant Starch/Hydrocolloid Interaction Products by Oven Drying and Roasting Samples of the products described in Example 4A were further processed by an intensive heat treatment (roasting) at 140° C. for 3 h. These roasted products were then evaluated as follows, most exhibiting increased dietary fiber contents. Cross-linked resistant starch alone was also evaluated as a control.

TABLE 2

| Hydrocolloid | TDF by AOAC- 991.43 | SV95 | SV95-W/O ppt | Water | Starch/oil |
|---|---|---|---|---|---|
| Cross-linked RS (control) | 30.6% | 4.0 | 3.8 | 5.8 | 10.4 |
| K-Carrageenan | 66.1% | 3.0 | 3.0 | 7.0 | 10.0 |
| K-Carrageenan/LBG (1:1) | 67.9% | 3.6 | 3.6 | 6.4 | 10.0 |
| Xanthan/LBG (1:1) | 65.1% | 5.4 | 4.6 | 3.4 | 11.8 |
| High methoxyl pectin | 69.4% | 3.6 | 3.8 | 5.8 | 10.4 |
| Low methoxyl pectin | 66.6% | 4.0 | 3.0 | 6.6 | 10.4 |
| Carboxymethyl cellulose | 96.3% | 4.0 | 3.8 | 5.2 | 11.0 |
| Sodium alginate | 79.8% | 3.6 | 3.0 | 6.0 | 11.0 |
| l-carrageenan | 74.5% | 3.4 | 3.0 | 6.8 | 10.2 |
| Tara gum | 43.6% | 4.2 | 5.4 | 4.2 | 10.4 |
| HPMC | 71.6% | 3.6 | 2.0 | 6.0 | 12.0 |

As a comparison, the control RS starch was subjected to the 4 h treatment, and it was found that, the TDF of the heat-treated control was reduced to 30.6%. Thus, it is believed that the presence of the hydrocolloid protective layer is even more significant where energy intensive treatments are employed. It appears that such control TDF decreases arise from the thermal decomposition of the RS granules, but that this effect is not seen with the interacted RS/hydrocolloid products. It is theorized that the heat treatment enhances the hydrocolloid protective function by forming an even more tightly interacted RS/hydrocolloid structure, thereby limiting access to the starch by the digestive enzyme. As best seen in Examples 3A, 3B, 3C, and 3D the protective layer of hydrocolloid plays a significant role in the improved enzyme resistance of the products of the invention.

Example 3C

Production of Resistant Starch/Hydrocolloid Interaction Products by Spray Drying One hundred parts of commercially available cross-linked resistant wheat starch (Fibersym 70, MGP Ingredients, Inc, Atchison, Kans.), 2 parts of hydrocolloid, and 250 parts of water were mixed for 30 min and heated for 1 min at 85° C. under continued mixing. The starch products were then spray dried and evaluated, along with cross-linked resistant starch alone as a control.

TABLE 3

| Hydrocolloid | Moisture (%) | AOAC-TDF 991.43 (%, db) |
|---|---|---|
| Cross-linked RS (control) | 5.6% | 75.9% |
| Sodium alginate | 5.3% | 90.5% |
| CMC | 5.8% | 89.1% |
| K-Carrageenan | 4.3% | 88.1% |
| l-carrageenan | 4.3% | 86.8% |

Example 3D

Production of Resistant Starch/Hydrocolloid Interaction Products by Dry Heating

One hundred parts of cross-linked resistant wheat starch (Fibersym 70, MGP Ingredients, Inc, Atchison, Kans.), and 1 part of carboxymethyl cellulose were mixed at room temperature. 40 parts water were then slowly added to the mixture with continuous stirring. The aqueous mixture was then heated to 60° C. (CM-A) and held for 1 h at that temperature. In order to minimize loss of starch crystallinity, the mixture was vacuum dried at 100° C. to decrease the moisture content to less than 5% (CM-V) and heated to 140° C. (CM-0h). The mixture was next heated for 4 h at 140° C. and samples were collected after 1 h, 2 h, 3 h, and 4 h and named CM-1h, CM-2h, CM-3h, and CM-4h, respectively. The level of moisture and enzyme resistance for each sample was analyzed by Total Dietary Fiber-AOAC 991.43 method, and compared with cross-linked resistant starch alone as a control.

TABLE 4

| Hydrocolloid | Code | Moisture (%) | AOAC-TDF 991.43 (%, db) |
|---|---|---|---|
| Cross-linked RS (control) | — | 8.8% | 73.6% |
| CMC after heating 1 h at 60° C. | CM-A | 29.7% | 83.7% |
| CMC after vacuum drying | CM-V | 1.6% | 89.2% |
| CMC after heating to 140° C. | CM-0 h | 1.5% | 86.0% |
| CMC after heating at 140° C., 1 h | CM-1 h | 1.4% | 89.8% |
| CMC after heating at 140° C., 2 h | CM-2 h | 0.9% | 87.0% |
| CMC after heating at 140° C., 3 h | CM-3 h | 0.9% | 82.0% |
| CMC after heating at 140° C., 4 h | CM-4 h | 0.8% | 84.6 |

Example 3E
Production of Resistant Starch/Hydrocolloid Interaction Products Prepared with and without Salt by Spray Drying One hundred parts of cross-linked resistant wheat starch (Fibersym 70, MGP Ingredients, Inc, Atchison, Kans.), 2 parts hydrocolloid, and 250 parts water were mixed for 30 min and heated for 1 min at 85° C. with continuous mixing. In certain samples, 2% CaCO$_3$, based upon the weight of starch taken as 100% by weight (starch weight basis) was added to the reaction mixture prior to heating. After cooling to room temperature, the products were spray dried and evaluated.

TABLE 5

| | Swelling in water | | Emulsion stability | | | | | |
| --- | --- | --- | --- | --- | --- | --- | --- | --- |
| | | | 25° C. | | | 95° C. | | |
| Hydrocolloid/Salt | 25° C. | 95° C. | ppt | Water | Starch/oil | Ppt | Water | Starch/oil |
| Cross-linked RS (control) | 3.6 | 2.8 | 2.8 | 8.0 | 9.2 | 2.8 | 6.4 | 10.8 |
| Hydrocolloids without salt | | | | | | | | |
| Xanthan/LBG (1:1) 2% | 5.2 | 10.0 | 5.2 | 4.6 | 10.2 | 7.4 | 2.8 | 11.6 |
| K-carrageenan/LBG (1:1) 2% | 3.2 | 3.2 | 3.4 | 8.0 | 8.6 | 2.8 | 6.0 | 11.2 |
| HPMC 2% | 2.8 | 3.2 | 2.8 | 8.0 | 9.2 | 2.4 | 7.0 | 10.6 |
| Gum Arabic 2% | 3.0 | 3.2 | 2.6 | 8.0 | 9.4 | 2.6 | 6.0 | 11.4 |
| Hydrocolloids with 2% CaCO$_3$ | | | | | | | | |
| K-carrageenan/LBG (1:1) 2% | 3.0 | 3.2 | 3.2 | 6.8 | 10.0 | 1.8 | 5.0 | 12.8 |
| HPMC 2% | 3.2 | 2.8 | 3.0 | 6.6 | 10.4 | 2.6 | 6.4 | 11.0 |
| Gum Arabic 2% | 3.2 | 2.8 | 3.0 | 8.0 | 9.0 | 3.2 | 4.8 | 12.0 |

Example 3F
Production of Resistant Starch/Hydrocolloid Interaction Products Prepared with Salts by Various Drying Methods One hundred parts of cross-linked resistant wheat starch (Fibersym 70, MGP Ingredients, Inc, Atchison, Kans.), 5 parts hydrocolloid, and either 2% starch weight basis KCl or CaCO$_3$, and 250 parts water were mixed for 30 min and heated for 1 min at 85° C. under continued mixing. Where high viscosity gum mixtures were used (mixtures of xanthan and locust bean gum (1:1), or κ-carrageenan (κ-C) and locust bean gum (1:1)) the hydrocolloid level was increased to 2% level. After cooling to room temperature, the products were oven or freeze dried. These products were evaluated as follows:

TABLE 6

| | Swelling in water | | Emulsion stability | | | | | |
| --- | --- | --- | --- | --- | --- | --- | --- | --- |
| | | | 25° C. | | | 95° C. | | |
| | 25° C. | 95° C. | ppt | Water | Starch/oil | ppt | Water | Starch/oil |
| Oven drying method | | | | | | | | |
| Hydrocolloids with KCl 2% | | | | | | | | |
| Gum Arabic 5% | 2.6 | 3.0 | 2.6 | 7.4 | 10.0 | 6.8 | 0.4 | 12.8 |
| K-Carrageenan 5% | 7.8 | 4.0 | 7.6 | 5.4 | 9.0 | 5.6 | 3.8 | 10.6 |
| K-C/LBG (1:1) 2% | 5.6 | 20.0 | 4.8 | 5.6 | 9.6 | 8.0 | 0.0 | 12.0 |
| HPMC 5% | 3.2 | 2.8 | 1.6 | 5.6 | 12.8 | 2.2 | 4.8 | 12.0 |
| Xanthan/LBG 2% | 7.6 | 5.6 | 2.6 | 7.4 | 10.0 | 3.2 | 7.0 | 9.8 |
| I-Carrageenan 5% | 3.8 | 3.0 | 10.4 | 0.0 | 9.6 | 5.2 | 4.4 | 10.4 |

TABLE 6-continued

|  | Swelling in water | | Emulsion stability | | | | | |
|---|---|---|---|---|---|---|---|---|
|  | | | 25° C. | | | 95° C. | | |
|  | 25° C. | 95° C. | ppt | Water | Starch/oil | ppt | Water | Starch/oil |
| Hydrocolloids with 2% CaCO₃ | | | | | | | | |
| I-Carrageenan 5% | 2.4 | 3.4 | 3.0 | 7.0 | 10.0 | 3.2 | 6.2 | 10.6 |
| HPMC 5% | 3.0 | 3.6 | 3.2 | 6.8 | 10.0 | 3.6 | 6.0 | 10.4 |
| Xanthan/LBG (1:1) 2% | 5.2 | 20.0 | 6.6 | 3.0 | 10.4 | 5.0 | 0.0 | 15.0 |
| Freeze drying method | | | | | | | | |
| Hydrocolloids with KCl 2% | | | | | | | | |
| Gum Arabic 5% | 3.2 | 3.2 | 2.6 | 7.4 | 10.0 | 2.6 | 6.4 | 10.6 |
| K-Carrageenan 5% | 10.8 | 3.6 | 9.0 | 2.0 | 9.0 | 5.4 | 4.4 | 10.4 |
| K-C/LBG (1:1) 5% | 8.8 | 7.4 | 8.8 | 1.8 | 9.4 | 7.8 | 0 | 12.2 |
| HPMC 5% | 3.4 | 2.6 | 2.6 | 7.0 | 10.4 | 2.8 | 7.0 | 10.2 |
| Xanthan/LBG 2% | 6.2 | 20.0 | 6.0 | 5.0 | 9.0 | 8.4 | 0 | 11.6 |
| 1-Carrageenan 5% | 5.4 | 2.8 | 9.0 | 0 | 11.0 | 5.8 | 4.0 | 10.2 |
| Hydrocolloids with 2% CaCO₃ | | | | | | | | |
| 1-Carrageenan 5% | 2.4 | 2.8 | 2.8 | 7.4 | 9.8 | 2.0 | 5.2 | 12.8 |
| HPMC 5% | 2.8 | 2.8 | 2.8 | 7.2 | 10.0 | 2.6 | 6.4 | 10.0 |
| Xanthan/LBG 2% | 8.8 | 20.0 | 0 | 0 | 20.0 | 4.4 | 0 | 15.6 |

Example 3G

Production of Non-Cross-Linked Resistant Starch/Hydrocolloid Interacted Products Non-cross-linked resistant starches in Example 1 were interacted with hydrocolloids as follows: Food grade carboxymethylcellulose (5.0 g) was slowly added to a 1 L beaker with 700 ml of water and mixed for 30 min. Non-cross-linked resistant starch (10 g) was added to the beaker and mixed for an additional 30 min. The product was then dried in a conventional forced air oven at 45° C. to a moisture content of about 10%.

TABLE 7

|  | TDF (%, db) | Swelling in water | |
|---|---|---|---|
|  |  | 25° C. | 95° C. |
| Non-cross-lined resistant starch control | | | |
| H240[1] | 44.7 | 2.4 | 7.1 |
| H330[2] | 37.3 | 4.3 | 7.5 |
| Non-cross-linked resistant starch interacted with carboxymethylcellulose | | | |
| H240-CMC | 52.3 | 5.9 | 8.1 |
| H330-CMC | 44.2 | 3.4 | 6.7 |

[1]Heat moisture treated RS2 from high amylase corn starch.
[2]Retrograded RS3 from high amylase corn starch.

Example 4

Preparation of Low-Calorie Pet Treats Using Cross-Linked Resistant Starch/Hydrocolloid Interacted Products Pet treat products were prepared using the cross-linked resistant starch/hydrocolloid interacted products of the invention. The formula employed was:

TABLE 8

| INGREDIENT | |
|---|---|
| Pregel 10[1] | 14.01% |
| Cross-linked Resistant Starch/hydrocolloid Interaction Product[2] | 31.39% |
| Protein[3] | 22.63% |
| Liver Digest | 2.92% |
| Magnesium Stearate | 1.09% |
| Glycerol Monostearate | 0.36% |
| Mixed Tocopherols | 0.07% |
| Titanium Dioxide | 0.36% |
| Blue #2 Lake | 0.15% |
| LIQUIDS | |
| Glycerin | 17.52% |
| Water | 7.30% |
| Oil | 2.19% |

[1]Pregelatinized wheat starch sold by MGP Ingredients of Atchison, KS, and containing and about 21% amylose, 73% amylopectin, 5% moisture, and less than 1% protein and ash.
[2]Cross-linked resistant wheat starch interacted with either CMC or Iota-Carrageenan.
[3]Gluten or combination of modified proteins.

In one procedure, the pet treats are formed by extrusion. The powder ingredients are mixed together in a batch mixer and then loaded into the live bin feeder of a Wenger TX-57 co-rotating twin screw extruder. The powder blend is then fed to the preconditioner of the extruder, where the glycerin is added to form a damp mixture. This mixture is then fed from the preconditioner into the barrel of the extruder, where the remaining liquid ingredients are added. In the barrel, the ingredients are subjected to increasing levels of temperature and shear in order to mix and knead the ingredients and form a melt of even consistency. The extruder screws ultimately push the melt through a restricted end-most die attached to the barrel outlet, forming cylindrical strands of extrudate, which are cut to form pellets. After cutting, the products fall onto a conveyor belt and are cooled. The final cooled pellets are then machine packaged into sealed bags. The recorded barrel temperatures from barrel inlet to outlet during this extrusion run were: Zone 1-100° F.; Zone 2-150° F.; Zone 3-150° F.; Zone 4-170° F.; Zone 5-170° F.

In another technique, the pellets made by the extrusion process described above were fed into an injection molder equipped with a single screw to force the pellets into the injection barrel. As the material is conveyed toward the front of the barrel, it forms a melt owing to heat and pressure conditions inside the injection barrel, until the proper amount of material has been collected. The screw then pushes the melt out of the barrel and into a mold kept at 60° F. or cooler. The material cools rapidly in the mold and solidifies into the desired treat shape. The mold is then opened and the treats are ejected. Temperature conditions recorded in the injection barrel were: Zones 1-4, 220° F.

In the following Examples, a variety of good quality food products were prepared using the starch/hydrocolloid products of the invention.

Example 5A

Reduced Fat Ice Creams with Interacted Cross-Linked Resistant Starch/Hydrocolloid Products Formulation

TABLE 9

| Ingredients | Percent (% by weight) |
| --- | --- |
| Whole milk (3.3% Fat) | 63.64% |
| Heavy cream (40% Fat) | 12.95% |
| Sugar | 8.57% |
| NFDM | 6.65% |
| Corn syrup solid (42 DE) | 3.00% |
| Interacted Cross-linked RS/hydrocolloid | 2.97% |
| Frutafit Inulin HD | 2.01% |
| Stabilizer/Emulsifier blend | 0.25% |
| Sucralose | 0.0083% |
| Mexican Vanilla Flavor (2x) @ 16 ml per 1000 g mix | |
| Aqueous Annatto (10/80 w/w) color @ 0.8 ml per 1000 g of mix | |

Interacted cross-linked resistant starch/hydrocolloids used in this recipe were prepared by procedures in Example 3C and 3E.
Procedure:
1. Blend dry ingredients
2. Reconstitute in milk (110° F.)
3. Homogenize (2000/500 psi)
4. Pasteurize (180° F., 25 s)
5. Overnight ageing at 42° F.
6. Addition of color and flavor
7. Freezing (draw temp 21° F.)
8. Packaging (21° F.)
9. Hardening (−45° F. to −50° F., 24 h)
10. Storage (−10° F. to −20° F.)

Example 5B

Reduced Fat Yogurts

Formulation

TABLE 10

| Ingredients | % by weight |
| --- | --- |
| Milk (2% Fat) | 87.50 |
| Sucrose | 4.48 |
| Interacted Cross-linked RS/hydrocolloid | 3.23 |
| Skim Milk Powder | 3.28 |
| Bulk Culture | 1.00 |
| Gelatin | 0.50 |
| Sucralose | 0.0054 |
| Total | 100.00 |

Interacted cross-linked resistant starch/hydrocolloids used in this recipe were prepared by the procedures of Example 3C and 3E.
Procedure:
1. Blend dry ingredients.
2. Add dry ingredients to luke warm milk (110° F.) while constantly agitating.
3. Heat up to 140° F. and homogenize at 2000 psi (1st stage) and 500 psi (2nd stage).
4. Pasteurize at 200° F. for 5 minutes.
5. Cool to 118° F. and add culture. Mix properly.
6. Incubate at 109° F.
7. Break acidity until pH is 4.3-4.5.
8. Cool to 40-42° F.

Example 5C

Reduced Fat, High-Fiber Sugar Snap Cookies

Formulation

TABLE 11

| Ingredients | % by weight |
| --- | --- |
| Pastry flour | 42.51 |
| Sugar | 21.20 |
| Shortening | 12.91 |
| Non-fat dried milk | 2.12 |
| Salt | 0.42 |
| Baking powder | 0.42 |
| Baking soda | 0.34 |
| Water | 14.00 |
| Interacted cross-linked RS/hydrocolloid | 6.17 |
| Total | 100.00 |

Interacted cross-linked resistant starch/hydrocolloids used in this recipe were prepared by the procedures of Examples 3C and 3E.
Procedure: A-200 Hobart mixer with paddle was used.
1. Scale shortening and put into mixing bowl.
2. Scale sweetener and add to mixing bowl.
3. Scale flour, nonfat dry milk, soda, baking powder, and salt mixed together. Then add mixture to mixing bowl.
4. Scale water, and then add to mixing bowl while mixing.
5. Set mixer control to 1st speed and mix for 30 seconds, then 2nd speed for 1 minutes and 30 seconds. Scrape down bowl and paddle and mix in 2nd speed for 2 minutes.
6. Note dough characteristics. (Dry, crumbly, Moist, etc.); roll out dough using rolling pin with wooden width guards.
7. Cut out cookies with 3" cutter.
8. Weigh 4 cookies and note weight.
9. Place the 4 cookies in the center of the pan with room to spread. Additional dough pieces should be placed at the ends and sides of the pan to absorb heat.

10. Bake for 12 minutes at 355° F. in convection oven, fan speed 1;
11. Allow cookies to cool for 30 minutes on pan used to bake on cooling rolling rack.
12. Weigh 4 cookies after cooling and note weight.
13. Measure the spread of the cookies.
14. Place 4 cookies edge to edge and note spread. Rotate cookies ¼ turn and re-measure.
15. Stack 4 cookies measure and note height.
16. Evaluate and note characteristics of baked cookies
17. Compare cookies for tenderness, spread, height and textures to others of the series Example 5D Reduced Fat, Enhanced Fiber Alfredo Sauces Formulation

TABLE 12

| Ingredients | % by weight |
| --- | --- |
| Butter | 11.82 |
| Parmesan Cheese | 6.95 |
| Romano Cheese | 8.34 |
| Interacted cross-linked RS/hydrocolloid | 8.41 |
| Egg Yolks | 5.01 |
| Heavy Whipping Cream | 36.72 |
| Water | 21.63 |
| Garlic | 1.11 |
| Total | 100.00 |

Interacted cross-linked resistant starch/hydrocolloids used in this recipe were prepared by the procedures of Example 3C and 3E.
Procedure:
1. Melt butter in sauce pan over medium heat.
2. Premix interacted cross-linked RS/hydrocolloid into heavy cream.
3. Add heavy cream, stirring constantly.
4. Stir in grated cheeses, stir constantly until melted.
5. Mix in egg yolk, stirring constantly.
6. Simmer on low heat for 3 to 5 minutes Example 5E Buttermilk Ranch Dressings Formulation

TABLE 13

| Ingredients | % by weight |
| --- | --- |
| Mayonnaise | 13.0 |
| Sour Cream | 14.0 |
| Buttermilk | 38.50 |
| Chives | 3.30 |
| Dill Leaves | 0.20 |
| Garlic | 1.80 |
| Shallots | 1.80 |
| Salt | 0.35 |
| Pepper | 0.15 |

TABLE 13-continued

| Ingredients | % by weight |
| --- | --- |
| Lemon Juice | 0.60 |
| Fat free skim milk | 15.0 |
| Interacted cross-linked RS/hydrocolloid | 11.30 |
| Total | 100% |

Interacted cross-linked resistant starch/hydrocolloids used in this recipe were prepared by the procedures of Example 3C and 3E.
Procedure:
1. Combine interacted cross-linked RS/hydrocolloid, Fat Free Skim Milk and Buttermilk, until starch product is fully mixed and hydrated.
2. Finely mince chives, dill leaves, garlic and shallots.
3. Blend together mixture from step 1 with remaining ingredients.
4. Stir well.

Example 5F

Pizza Sauce

Interacted cross-linked resistant starch/hydrocolloid products were prepared by drum drying and used for pizza sauce. One hundred parts of cross-linked resistant starch (Fibersym 70, MGP Ingredients, Inc, Atchison, Kans.), and 2 parts hydrocolloid were mixed with 300 parts of water. The drying drum was operated at a speed of 18 rpm and steam pressure of 65 psi. The dried product was screened with a #2 screen and used in the pizza sauce.

Formulation

TABLE 14

| Ingredients | % by weight |
| --- | --- |
| Water | 56.4 |
| Tomato paste | 36.0 |
| Interacted cross-linked RS/hydrocolloid | 2.0 |
| Oil | 1.0 |
| Sugar | 2.0 |
| Salt | 1.8 |
| Spices | 1.8 |
| Total | 100.00 |

Procedure:
1. Blend all dry ingredients together well.
2. Blend water, tomato paste and oil together in bowl.
3. Slowly add dry ingredients to 2) and with a wire whip mix till smooth.
4. Spread desired amount on pizza crust and process as normal.

We claim:
1. A method of forming a starch product comprising the steps of forming a mixture by mixing together respective quantities of RS4 resistant starch granules and hydrocolloid in water, the amount of said starch in said mixture being at least about 15% by weight, reacting the starch granules and hydrocolloid in said water over a period of from about 20 minutes to 2 hours, and then drying the hydrocolloid-interacted starch granules to give said starch product comprising from about 80-99.9% by weight of said dried, hydrocolloid-interacted starch granules in the form of individual, discrete, and separate hydrocolloid-interacted starch granules, with the hydrocolloid forming coatings on the surfaces of said starch granules, said hydrocolloid-interacted starch granules having at least about 20% resistance to α-amylase digestion.

2. The method of claim 1, including the step of recovering dried starch product.

3. The method of claim 1, including the step of drying said mixture by a method selected from the group consisting of oven drying, vacuum drying, spray drying, freeze drying, flash drying, fluidized bed drying, thermal reactor drying, and drum drying.

4. The method of claim 1, including the step of roasting said dried starch product.

5. The method of claim 1, said mixture including at least about 30% by weight resistant starch.

6. The method of claim 1, said period being from about 20 minutes-1 hour.

7. The method of claim 1, including the step of adjusting the pH of said mixture of a level from about 2-10.

8. The method of claim 1, including the step of heating said mixture.

9. The method of claim 8, including the step of heating said mixture to a temperature of from about 25-100° C.

10. The method of claim 1, said RS4 resistant starch selected from the group consisting of wheat, waxy wheat, corn, waxy corn, high amylose corn, oat, rice, tapioca, mung bean, sago, sweet potato, barley, triticale, sorghum, banana, arrowroot, and potato starches and mixtures thereof.

11. The method of claim 1, including the step of further treating said starch product by subjecting the starch product to a temperature of from about 110-150° C. for a period of about 1-5 hours.

12. The method of claim 1, said hydrocolloid selected from the group consisting of pectins, carrageenans, alginates, celluloses, and mixtures thereof.

13. The method of claim 12, said hydrocolloid selected from the group consisting of xanthan, locust bean gum, guar gum, modified celluloses, sodium alginate, gum arabic, pectin, tara, agar, carrageenans, konjac, gellan, curdlan, and mixtures thereof.

14. The method of claim 12, said hydrocolloid selected from the group consisting of microfibrillated cellulose, microcrystalline cellulose, methyl cellulose, hydroxypropyl methyl cellulose, carboxymethylcellulose, ethylmethyl cellulose, and hydroxypropyl cellulose.

15. The method of claim 1, said starch granules of said starch product having a crystalline phase.

16. The method of claim 15, said mixture including a salt.

17. The method of claim 16, said salt selected from the group consisting of alkali metal salts, alkaline earth metal salts, and salts of ammonium, chromium, zinc, silver, iron, and aluminum.

18. The method of claim 16, said salt being present at a level of from about 0.01-50% by weight, based upon the total weight of the starch fraction of said product taken as 100% by weight.

19. The method of claim 18, said level being from about 1-10% by weight.

20. The method of claim 1, including the step of adding said starch product to other ingredients to form a food product.

21. The method of claim 20, said food product selected from the group consisting of human food products and animal feed.

22. The method of claim 1, said hydrocolloid-interacted starch granules having at least about 40% resistance to α-amylase digestion.

23. The method of claim 1, said mixture consisting essentially of said starch granules, hydrocolloid, and water.

24. A method of forming a starch product comprising the steps of forming a mixture by mixing together respective quantities of RS4 resistant starch granules and hydrocolloid in water, the amount of said starch in said mixture being at least about 15% by weight, reacting the starch granules and hydrocolloid in said water over a period of from about 5 minutes to 2 hours, and then drying the hydrocolloid-interacted starch granules to give said starch product comprising from about 80-99.9% by weight of said dried, hydrocolloid-interacted starch granules in the form of individual, discrete, and separate hydrocolloid-interacted starch granules, with the hydrocolloid forming coatings on the surfaces of said starch granules, said starch product being further treated by subjecting the starch product to a temperature of from about 110-150° C. for a period of from about 1-5 hours, said hydrocolloid-interacted starch granules having at least about 20% resistance to α-amylase digestion.

25. The method of claim 24, including the step of recovering dried starch product.

26. The method of claim 24, including the step of drying said mixture by a method selected from the group consisting of oven drying, vacuum drying, spray drying, freeze drying, flash drying, fluidized bed drying, thermal reactor drying, and drum drying.

27. The method of claim 24, said further treating step including the step of roasting said dried starch product.

28. The method of claim 24, said mixture including at least about 30% by weight resistant starch.

29. The method of claim 24, said period being from about 20 minutes-1 hour.

30. The method of claim 24, including the step of adjusting the pH of said mixture of a level from about 2-10.

31. The method of claim 24, including the step of heating said mixture.

32. The method of claim 31, including the step of heating said mixture to a temperature of from about 25-100° C.

33. The method of claim 24, said RS4 resistant starch selected from the group consisting of wheat, waxy wheat, corn, waxy corn, high amylose corn, oat, rice, tapioca, mung bean, sago, sweet potato, barley, triticale, sorghum, banana, arrowroot, and potato starches and mixtures thereof.

34. The method of claim 24, said hydrocolloid selected from the group consisting of pectins, carrageenans, alginates, celluloses, and mixtures thereof.

35. The method of claim 34, said hydrocolloid selected from the group consisting of xanthan, locust bean gum, guar gum, modified celluloses, sodium alginate, gum arabic, pectin, tara, agar, carrageenans, konjac, gellan, curdlan, and mixtures thereof.

36. The method of claim 35, said hydrocolloid selected from the group consisting of microfibrillated cellulose, microcrystalline cellulose, methyl cellulose, hydroxypropyl methyl cellulose, carboxymethylcellulose, ethylmethyl cellulose, and hydroxypropyl cellulose.

37. The method of claim 24, said starch granules of said starch product having a crystalline phase.

38. The method of claim 24, said mixture including a salt.

39. The method of claim 38, said salt selected from the group consisting of alkali metal salts, alkaline earth metal salts, and salts of ammonium, chromium, zinc, silver, iron, and aluminum.

40. The method of claim 38, said salt being present at a level of from about 0.01-50% by weight, based upon the total weight of the starch fraction of said product taken as 100% by weight.

41. The method of claim 40, said level being from about 1-10% by weight.

42. The method of claim 24, including the step of adding said starch product to other ingredients to form a food product.

43. The method of claim 42, said food product selected from the group consisting of human food products and animal feed.

44. The method of claim 24, said hydrocolloid-interacted starch granules having at least about 40% resistance to α-amylase digestion.

45. The method of claim 24, said mixture consisting essentially of said starch granules, hydrocolloid, and water.

* * * * *